(12) United States Patent
Turnbull et al.

(10) Patent No.: US 7,441,464 B2
(45) Date of Patent: Oct. 28, 2008

(54) STRAIN GAUGE SENSOR SYSTEM AND METHOD

(75) Inventors: Frank Turnbull, Larkhall (GB); Wenwei Zhang, Bellshill (GB)

(73) Assignee: Honeywell International Inc., Morristown, NJ (US)

( * ) Notice: Subject to any disclaimer, the term of this patent is extended or adjusted under 35 U.S.C. 154(b) by 54 days.

(21) Appl. No.: 11/594,624

(22) Filed: Nov. 8, 2006

(65) Prior Publication Data
US 2008/0105059 A1  May 8, 2008

(51) Int. Cl.
*G01L 1/12* (2006.01)

(52) U.S. Cl. .................. 73/779; 73/146; 73/146.2; 73/862.391; 73/862.41; 73/862.42

(58) Field of Classification Search ............ 73/146, 73/146.2, 779, 862.391, 862.41, 862.42
See application file for complete search history.

(56) References Cited

U.S. PATENT DOCUMENTS

| | | | | |
|---|---|---|---|---|
| 3,850,031 A * | 11/1974 | Schwenzfeier et al. | ... | 73/862.41 |
| 3,854,329 A * | 12/1974 | Jones | ...... | 73/862.41 |
| 3,871,217 A * | 3/1975 | Miley | ...... | 73/862.41 |
| 4,158,962 A * | 6/1979 | Conoval | ...... | 73/862.41 |
| 4,587,855 A * | 5/1986 | Yamada et al. | ...... | 73/862.451 |
| 4,928,538 A * | 5/1990 | Burdess et al. | ...... | 73/862.41 |
| 4,979,125 A * | 12/1990 | Kwun et al. | ...... | 702/35 |
| 5,303,593 A | 4/1994 | Kremidas | ...... | 73/708 |
| 5,493,918 A * | 2/1996 | Barat et al. | ...... | 73/862.41 |
| 5,861,558 A | 1/1999 | Buhl et al. | ...... | 73/777 |
| 6,289,750 B1 * | 9/2001 | Baumann et al. | ...... | 73/862.583 |
| 6,357,301 B1 * | 3/2002 | Berghs et al. | ...... | 73/862.451 |
| 6,550,320 B1 * | 4/2003 | Giustino | ...... | 73/146 |
| 6,810,749 B2 | 11/2004 | Jorgensen et al. | ...... | 73/800 |
| 6,843,143 B2 * | 1/2005 | Steele et al. | ...... | 73/862.393 |
| 6,928,882 B2 * | 8/2005 | Stammberger et al. | ...... | 73/826 |
| 7,010,990 B2 * | 3/2006 | Umeno et al. | ...... | 73/862.326 |
| 7,055,365 B2 | 6/2006 | Yanagi | ...... | 73/1.13 |
| 7,093,498 B2 | 8/2006 | Herbert et al. | ...... | 73/778 |
| 7,116,209 B2 | 10/2006 | Hermann et al. | ...... | 338/2 |
| 7,171,848 B2 * | 2/2007 | Giustino et al. | ...... | 73/146 |
| 7,249,498 B2 * | 7/2007 | Miyoshi et al. | ...... | 73/146 |
| 2004/0200273 A1 * | 10/2004 | Giustino et al. | ...... | 73/146 |
| 2005/0072223 A1 * | 4/2005 | Fennel et al. | ...... | 73/146.2 |
| 2006/0030062 A1 | 2/2006 | He et al. | ...... | 438/18 |
| 2008/0011092 A1 * | 1/2008 | Miyoshi et al. | ...... | 73/779 |

* cited by examiner

*Primary Examiner*—Edward Lefkowitz
*Assistant Examiner*—Freddie Kirkland, III
(74) *Attorney, Agent, or Firm*—Kermit D. Lopez; Luis M. Ortiz

(57) ABSTRACT

A strain gauge sensor system and method for measuring the strain in a member, such as a fiber rope, has a sensor target assembly having a plurality of magnets carried spaced apart by individual gauge lengths along the member. Position and trigger sensor devices are configured spaced apart along side a desired path of travel of the member. When the member is fed along the desired path of travel, the trigger sensor device, in response to magnetically sensing a passing magnet, triggers the position sensor device to read the position of an adjacent passing magnet. The strain in the gauge length is determined from the read position. RFID tags placed on the member between the magnets can be identified by an RF reader to identify a particular gauge length being measured. The system can include a deployment device for feeding the member along the desired path.

13 Claims, 13 Drawing Sheets

STRAIN GAUGE SENSOR SYSTEM AND METHOD

Embodiments are generally related to sensor methods and systems. Embodiments are also related to strain gauge sensor methods and systems for measuring the strain in a member, in particular, a member such as line. Embodiments are also related to magnetoresistive sensing devices. Also, embodiments are related to strain gauge sensor methods and systems for measuring strain in mooring lines, such as fiber ropes.

BACKGROUND OF THE INVENTION

High performance fiber ropes and other types of lines are used in a variety of industrial applications such as mooring deep-water drilling and production platforms. Honeywell Spectra® fiber rope, a kind of synthetic fiber rope constructed from high performance polymers, is widely used in civil, military and off-shore industries. The synthetic fiber ropes have high strength-to-weight ratios and possess adequate stiffness.

In mooring applications, a loss in structural integrity of such mooring ropes affect the rope performance and can lead to rope failure resulting in partial or even total breakouts of platforms or vessels. The financial consequences of any mooring accident can be enormous. Strain accumulation and change along the rope during rope deployment is an essential key factor in rope failure. Detecting strain which may affect the performance of the rope should provide a reliable benchmark with which to estimate the remaining life and establish criteria for rope recertification or retirement.

Known techniques for detecting strain in fiber ropes employ fiber optic monitoring systems based on Brillouin scattering or optical time-domain reflectometry. In the former, one or more single-mode glass fibers are applied to the rope. Due to elongation limitation of glass fiber, a special wind pattern is applied to integrate the glass fiber into the measured rope and extend the elongation range of the fiber. The single-mode glass fiber solution has advantages in that it has relative long measurement range (5 km), good gauge length (1 m), relative good strain measurement resolution (0.3% over 1 m gauge) and good elongation measurement range (up to 9%). However, it suffers from easy breakage and requires using a complicated winding method and high source optical power into the fiber.

In optical time-domain reflectometry, one or more multi-mode plastic fibers are applied to the rope. Adopting a multi-mode plastic fiber optic method for measuring strain is advantageous in that the method has good reliability and no special winding pattern is required. However, this latter method suffers from short measurement range of rope (up to 1 km), long gauge length (10 m), poor strain measurement resolution (less than 1% over 1 m gauge), poor elongation measurement range (up to 7%) and requires the use of a special process to add the reflective interfaces between the gauge length of the rope. For example, a process of UV writing or cutting and splicing the optical fiber can be used to change the refraction index to add the reflective interfaces.

There is a continuing need to provide improved systems and methods for monitoring the performance of members, such as fiber ropes, in services which provide an early warning of the loss of structural integrity and, where appropriate, enhance safe deployment thereof.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor methods and systems.

It is another aspect of the present invention to provide for improved strain measurement methods and systems.

It is a further aspect of the present invention to provide for improved methods and systems for monitoring the strain in flexible members such as mooring lines.

The aforementioned aspects of the invention and other objectives and advantages can now be achieved as described herein.

According to one aspect, a strain gauge sensor system for measuring strain in a member includes a sensor target assembly for carrying on the member and first and second sensor devices for magnetically sensing the sensor target assembly. The sensor target assembly has at least one pair of adjacent first and second magnets spaced apart by a gauge length. The first and second sensor devices are spaced apart to respectively sense the magnetic fields of the first and second magnets. In use, relative motion between the member carrying the sensor target assembly and the first and second sensor devices causes the first and second sensor devices to sense the first and second magnets and thereby generate first and second position signals, respectively. The first and/or second position signals can be processed to determine the gauge length, in comparison to the original gauge length, and therefore the strain in the member.

The strain sensor system is capable of measuring strain in a member, such as a rope, in a passive and non-contact manner and has an unlimited measurement range, good strain measurement resolution and reliability, and reduced gauge length compared to prior art line strain sensor systems.

First and second devices can be interconnected such that the first position signal triggers operation of the second sensor device to generate the second position signal.

The sensor target assembly can include a plurality of magnets distributed apart by individual gauge lengths along the member. First and second sensor devices are located spaced apart along side a desired path of travel of the member such that, when a length of the member is fed along the desired path of travel, the first sensor device, in response to sensing a passing magnet, triggers the second sensor device to measure the position of an adjacent magnet passing magnet and thereby generate a second position signal. The second position signal can be processed to determine the individual gauge length between the adjacent passing magnets and, in turn, the strain within the individual gauge length.

The first sensor device can be at least one magnetoresistive sensor or a Hall Effect sensor or any array of such sensors. Also, the second sensor device can be at least one magnetoresistive sensor or Hall Effect sensor or an array of such sensors. Adopting an array of magnetoresistive sensors or Hall Effect sensors in the first and/or second position devices enables the system to measure longer strain ranges in each gauge length. The magnetoresistive sensors can be AMR, GMR or TMR chips. By using TMR sensor chips as the magnetoresisitve sensors, smaller and cheaper magnets can be successfully employed in the sensor target assembly which enables the size of the sensor target assembly to be minimized and the effects of the magnets on the performance of the rope to be limited.

The sensor target assembly can include one or more RFID tags for identifying individual gauge lengths being measured by the strain gauge sensor system, the RFID tag(s) being carried on the member between respective magnets. An RFID reader can be located along side the desired path of travel for reading the RFID tag(s) successively passing the RFID reader thereby identifying each individual gauge length being measured by the strain gauge sensor system. Incorporating RFID tags into the sensor target assembly between adjacent magnets and arranging an RFID reader 5 along side the path of travel of the rope is advantageous in that individual gauge lengths being measured by the first and/or second sensor devices can be immediately and reliably identified by the RFID reader sensing each RFID tag identifying each individual gauge length.

According to another aspect, a strain gauge sensor system for measuring the strain in a member, such as a fiber rope, includes a sensor target assembly comprising a plurality of magnets carried spaced apart by individual gauge lengths along the member. The system also includes a position sensor device for magnetically measuring the position of a moving magnet and a trigger sensor device for triggering the position sensor device in response to magnetically sensing an adjacent moving magnet. The position and trigger sensor devices can be configured spaced apart along side a desired path of travel of the member such that, when the member is fed along the desired path of travel, the trigger sensor device, in response to sensing a passing magnet of the sensor target assembly, triggers the position sensor device to read the position of an adjacent passing magnet.

The position and trigger sensor devices can be configured such that the adjacent magnet position can be read when the member is fed along a path of travel which is substantially linear or non-linear.

The position sensor device can comprise one or an array of magnetoresistive sensors or Hall Effect sensors. The magnetoresistive sensors can comprise one or more magnetoresistive sensors selected from the group consisting of anisotropic magnetoresistive AMR, giant magnetoresisitve GMR or tunnel magnetoresistive TMR chips. The trigger sensor device can comprise one or more magnetoresisitve or Hall Effect sensors and optionally a comparator coupled to the magnetoresistive or Hall Effect sensor(s). Combining a threshold comparator with an analog MR or Hall Effect sensor array is advantageous in that a trigger signal can be raised with less hysteresis than a digital MR or hall effect sensor thereby improving the triggering accuracy of the trigger device sensor The system can further include a controller coupled to the outputs of the trigger sensor and the array of magnetoresistive or Hall Effect sensors such that controller in response to receiving the trigger signal reads the outputs of said array of magnetoresistive or Hall Effect sensors and compares the measured gauge length determined from said outputs with a predetermined original gauge length to thereby provide the strain in said gauge length The system can additionally include a plurality of RFID tags for identifying individual gauge lengths being measured by the strain gauge sensor system. The RFID tags can be carried on the member between respective magnets. An RFID reader can be located along side the desired path of travel for reading each RFID tag successively passing the RFID reader thereby identifying each individual gauge length being measured by the strain gauge sensor system.

When the member is a fiber rope, the sensor target assembly can include a carrier tube integrated in rope and the magnets and/or the RFID tags can be embedded in the carrier tube. The carrier tube can be for example a plastic tube and wherein the magnets and/or the RFID tags are embedded in silicone filled in the carrier tube. Embedding the magnets and RFID tags in silicone filling in the carrier tube enables excellent elongation of the senor target assembly. Alternatively, the magnets and/or RFID tags can be carried or integrated in rubber bands fixed around the rope. Mounting the magnets and RFID tags around the rope using rubber bands, diminishes the effect of rope rotation during deployment. The system can also include a deployment device for deploying the fiber rope along the desired path of travel. The position and trigger sensor devices and/or the RFID reader can be carried on the deployment device.

According to yet another aspect, a method of measuring strain in a member, the method comprises carrying a plurality of magnets spaced apart by gauge lengths along a length of the member, providing a position sensor device spaced apart from a trigger sensor device, straining the member, moving the member under strain past the position sensor and trigger sensor devices, generating a trigger signal in response to sensing the magnetic field of a passing magnet using the trigger sensor, transmitting the trigger signal to the position sensor device, sensing the magnetic field of an adjacent passing magnet using the position sensor device, generating a position signal using the position sensor device in response to receiving the trigger signal, determining the strain in the gauge length between the adjacent magnets from the position signal.

The method can also further comprise carrying RFID tags on the member between the magnets and reading the RFID tags to identify each gauge length.

The step of providing the position sensor device can comprise providing at least one first magnetoresistive or Hall Effect sensor.

The step of providing the trigger sensor device can comprise providing the at least one first magnetoresistive or Hall Effect sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
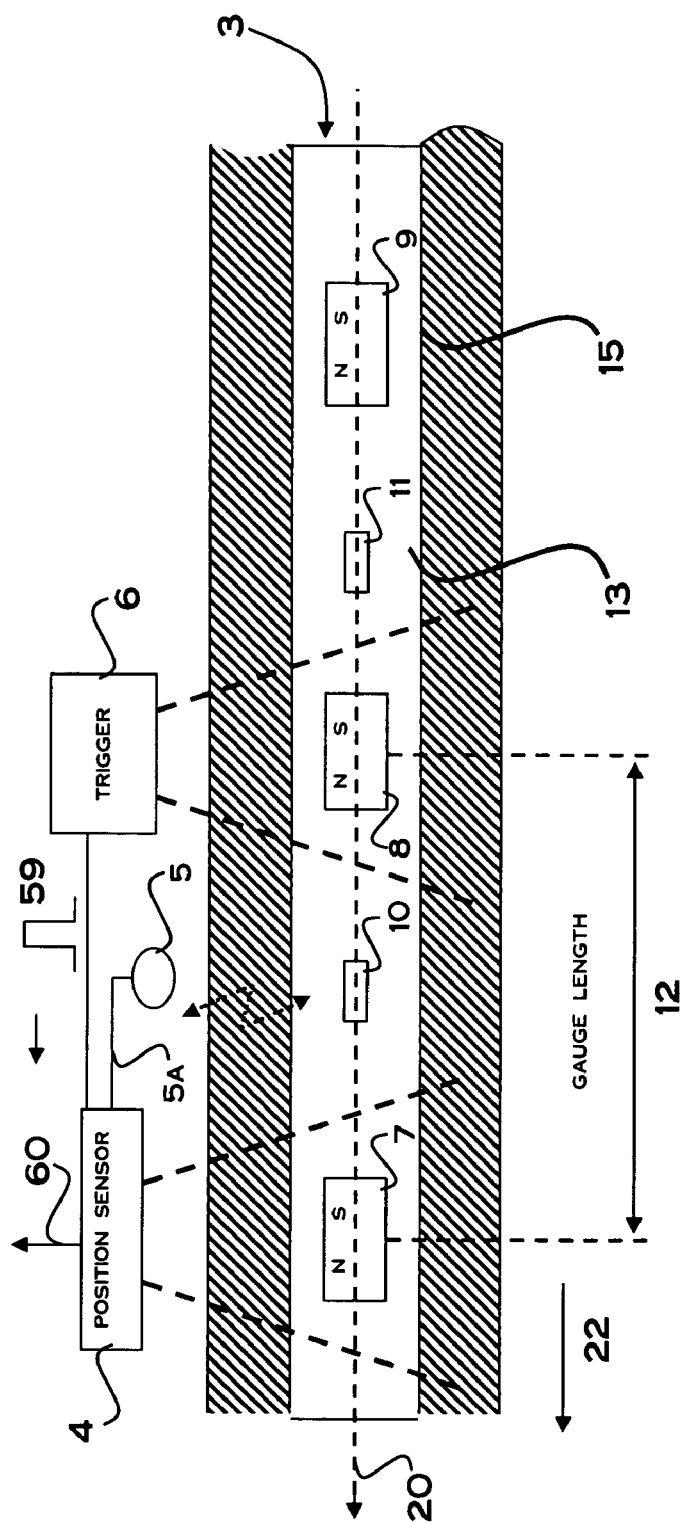
FIG. 1 illustrates a schematic of a strain gauge sensor system for measuring strains in a line according to a preferred embodiment in which a portion of the line, a fiber rope, incorporating the sensor target assembly is shown in longitudinal cross-section.

Referring to FIG. 1 of the accompanying drawings, which illustrates schematic of a strain gauge sensor system for measuring strain in a line according to one embodiment, the sensor system 1 has a sensor target assembly 3 carried on a line 2 and includes magnets 7, 8, 9 spaced apart by gauge lengths 12 along the line 2. System 1 also includes first and second sensor devices 6, 4 for sensing the magnetic fields of the magnets 7, 8, 9.

The strain gauge sensor system can be applied in a number of different applications, such as, for example, mooring line deployment systems. The system 1 of the illustrative embodiment of the accompanying drawings is adapted for use in marine mooring applications in which the line is a high performance fiber rope, such as Honeywell spectra fiber rope, and the sensor target assembly 3 is carried along the length of the entire rope. For the sake of clarity, FIG. 1 of the strain gauge system 1 of the illustrative embodiment of depicts only a portion of the entire line 2 incorporating the sensor target sensor assembly 3.

Also, in the illustrative embodiment, the first sensor device 6 serves as a trigger sensor device 6 and the second sensor device 4 serves as a position sensor device 4. The trigger and position sensor devices 6,4 are coupled together and located spaced apart along side a desired path of travel 20 of the line such that, when a length of the line is fed along the desired travel path 20, the trigger sensor device 6, in response to detecting a passing magnet 8,9, triggers the position sensor device 4 to measure the position of an adjacent passing magnet 7,8 and thereby generate a position signal representing the relative position between the passing adjacent magnets 7,8 or 8,9, and which is a measure of the strain in the gauge length 12. The gauge length 12, which can be determined from the position signal, can be compared to an original gauge length for an unstrained rope to calculate the strain.

Advantageously, by carrying magnets 7,8,9 on the line 2 at spaced apart intervals equal to the gauge length 12 and moving the line so that the spaced apart trigger and position sensor devices 6, 4 can measure the gauge length between adjacent moving magnets 7, 8, 9, an improved strain sensor system is provided for measuring line strain in a passive and non-contact manner which has an unlimited measurement range, good strain measurement resolution and reliability, and reduced gauge length compared to prior art line strain sensor systems.

Figure 2A:
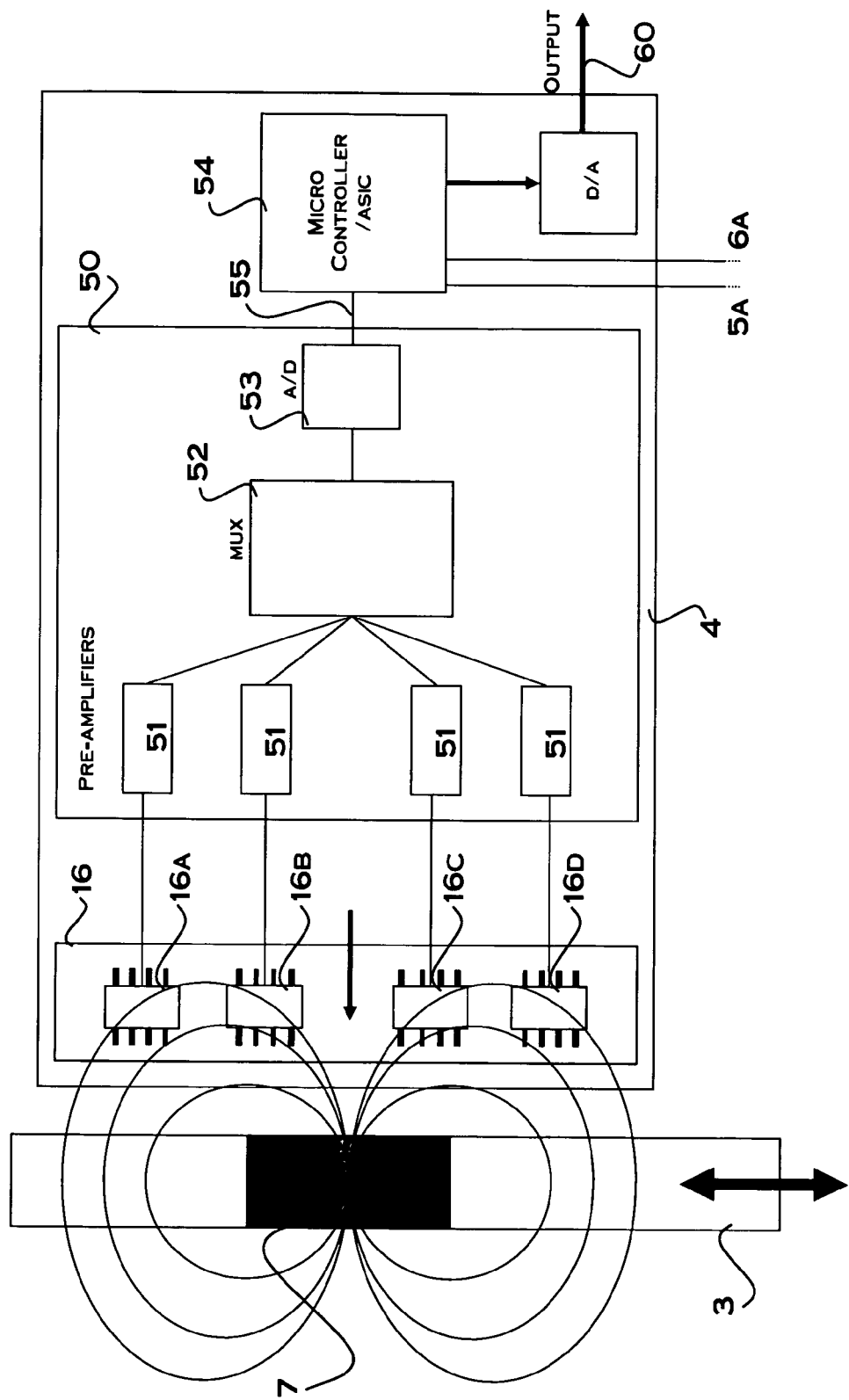
FIG. 2A illustrates, in more detail, the position sensor device of FIG. 1 measuring the position of a passing magnet.

Referring to FIG. 2A, which illustrates in more detail the position sensor device of FIG. 1, position sensor device 4 includes a sensor array 16 of individual magnetoresistive sensors 16A-D which are arranged to measure the relative position change of the individual gauge of the line at one end of the gauge against another end of the gauge, knowing the strain in that individual gauge. The position sensor device 6 also includes signal conditioning circuitry 50 which is configured to process the outputs of the magnetoresistive sensors 16A-D to determine the position of the magnet passing the position sensor device 4 and therefore the individual gauge length 12 between each pair of passing magnets. Signal conditioning circuitry 50 includes pre-amplifiers 51 having inputs connected to respective analogue position outputs of the individual MR sensors 16A-D and having outputs coupled via a multiplex device 52 to an analogue to digital converter 53 which provides position signals 55 to a controller 54 such as microcontroller, ASIC, or other processor.

Magnetoresistive sensors 16A-D (MR) are Tunnel Magneto Resistive (TMR) sensor chips which are advantageous in that such TMR sensors possess a 70% relative resistance value at room temperature making them highly sensitive to the magnetic field of the magnets 7,8,9 passing the sensors. By using TMR sensor chips, smaller and cheaper magnets can be successfully employed in the sensor target assembly 3 thereby enabling the size of the sensor target assembly 3 to be minimized and the effects of the magnets on the performance of the rope 2 to be limited.

Alternatively, other magnetoresistive MR sensors can be employed in the sensor array 16 such as Anisotropic Magneto Resistive (AMR) sensors or Giant Magneto Resistive (GMR) sensors. Alternatively, Hall Effect sensors can be employed as well for this application. In the illustrative embodiment, the TMR sensor array 16 is made up four TMR sensors. However, the sensor array 16 can consist of as little as two analog MR sensor units up to several hundred units. The length of array 16 (or number of sensors in the array) depends on the elongation and strain range measured. Large measured strain range requires longer arrays to be able to measure the full range of the strain.

Figure 2B:
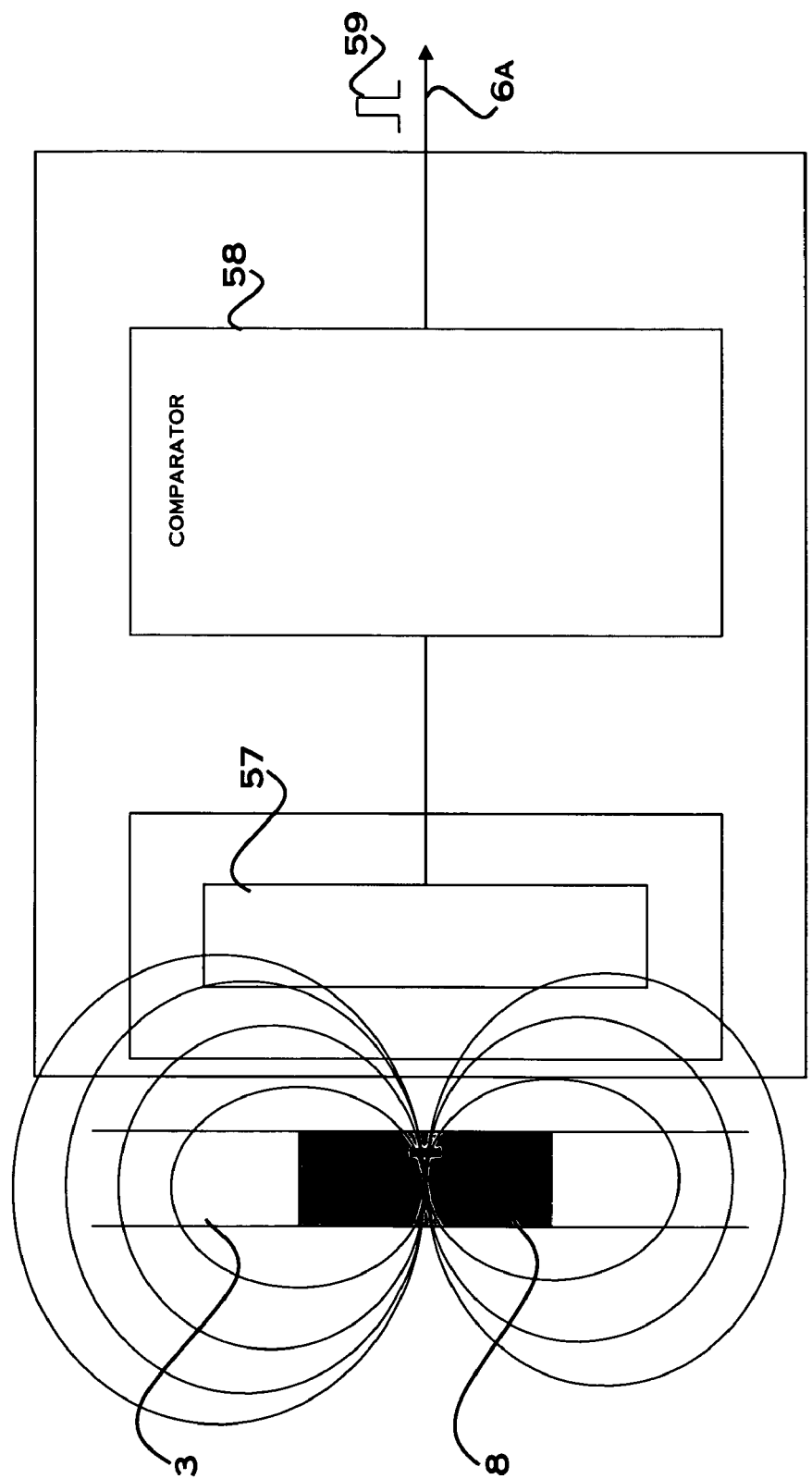
FIG. 2B illustrates, in more detail, the trigger sensor device of FIG. 1 triggering in response to a passing magnet.
Figure 3:
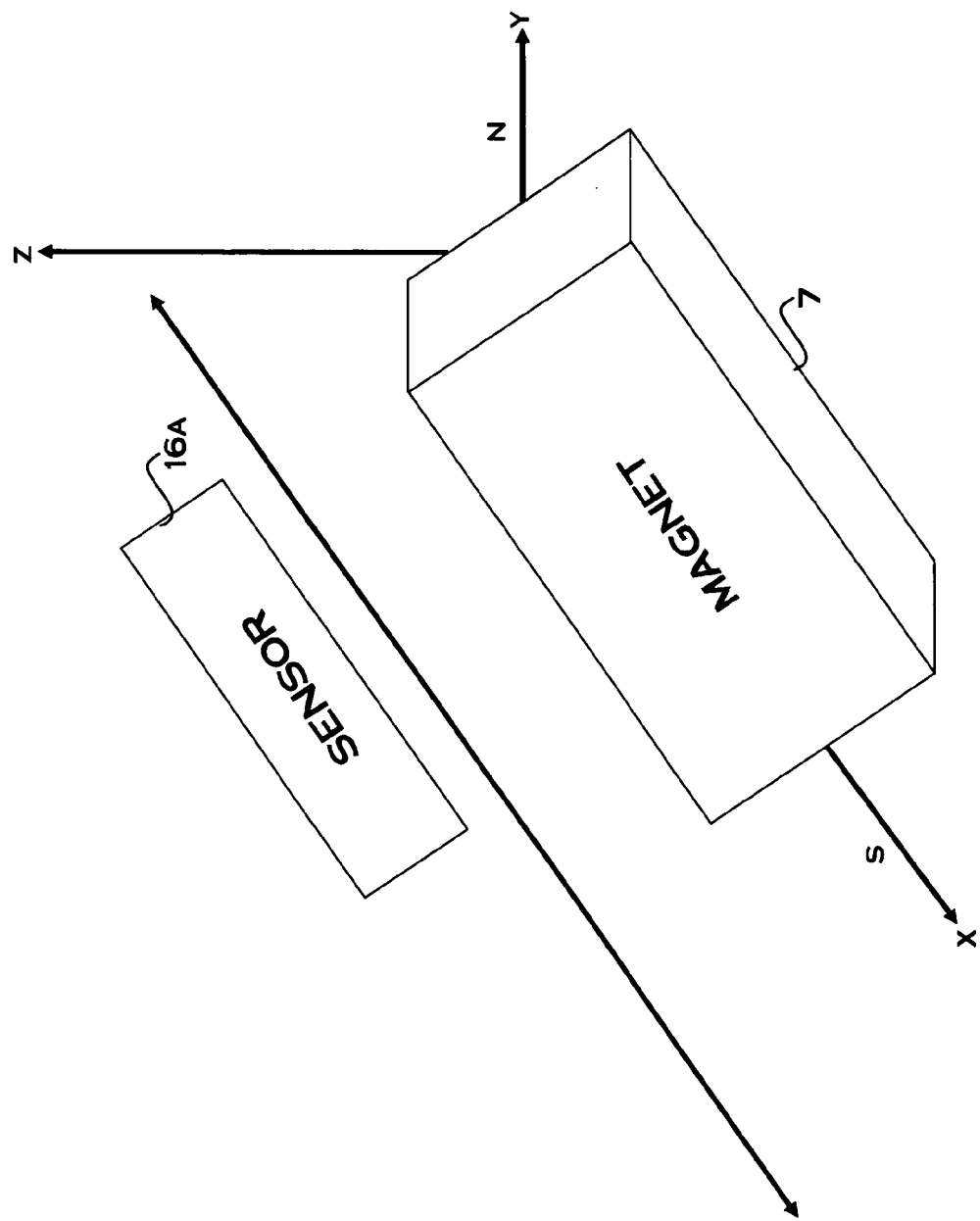
FIG. 3, illustrates an example of one of the MR sensors of the position sensor device of FIG. 1 measuring the position of a passing magnet.
Figure 4:
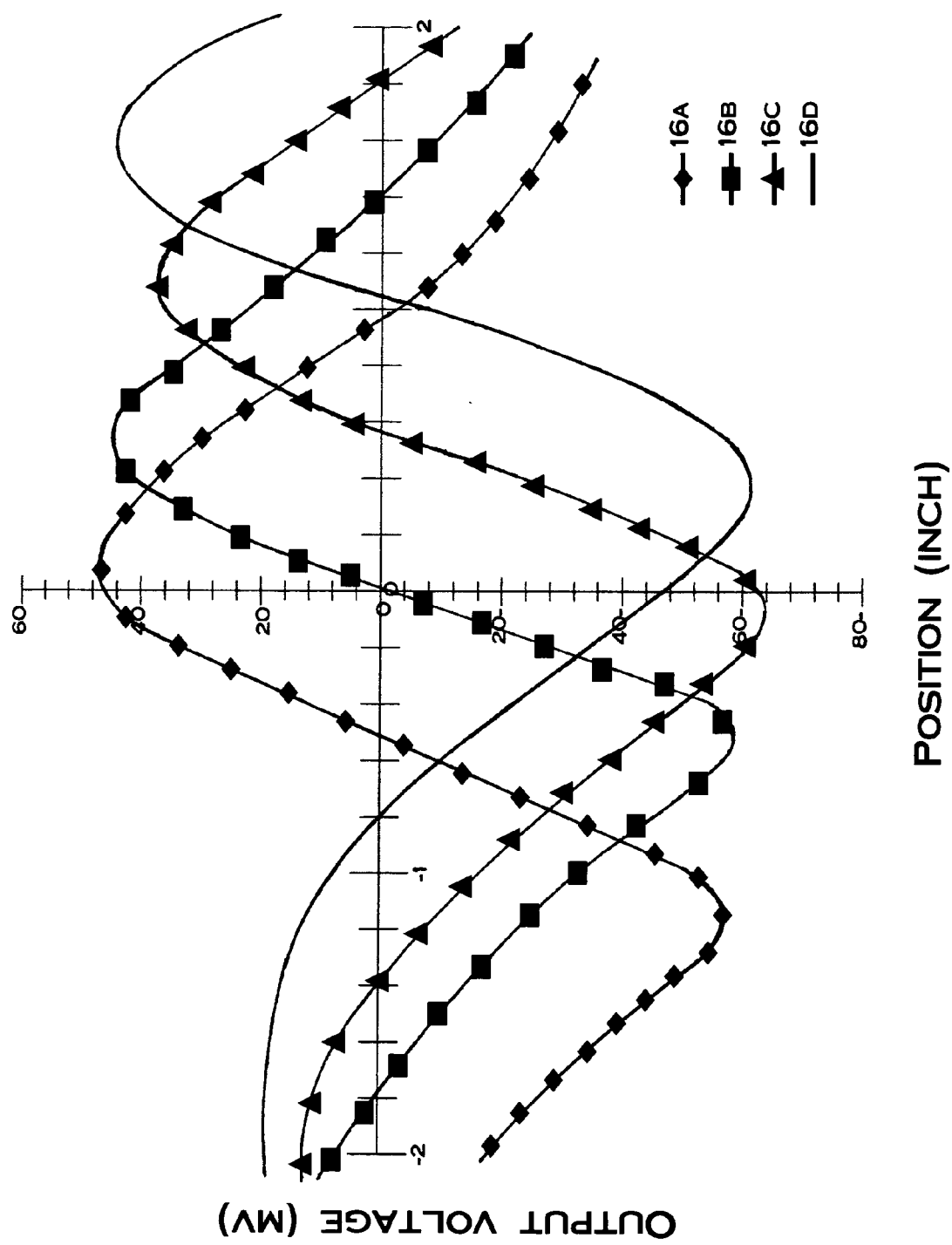
FIG. 4, illustrates the angle position of a field from the passing magnet versus the strength of a magnetic field measured by different MR sensors of the position sensor device of FIG. 1.
Figure 5:
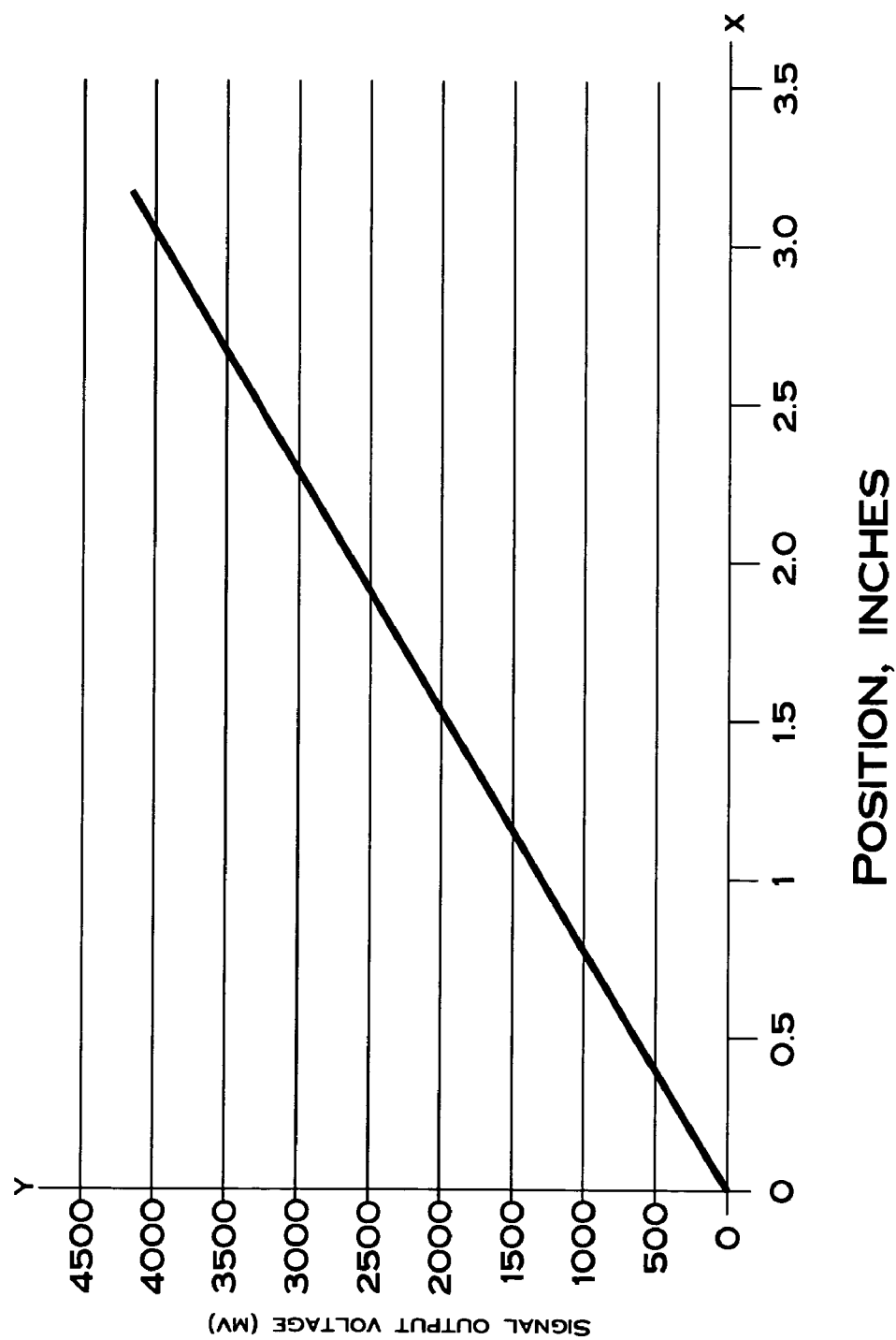
FIG. 5 illustrates the linear output of the position sensor device of FIG. 1 which is proportional to the position of the passing magnet.

Reference will now be made to FIGS. 2-5 to explain operation of the position sensor device 4 which is configured to measure strain by measuring magnet position change against the magnetoresistive sensor array 16 in a certain gauge length. As shown in FIG. 3, which illustrates an example of a single MR sensor of the sensor array 16 measuring the position of a passing magnet 7, the MR sensor is configured in saturation mode so that the output of the sensor is a function of angle between the external magnetic field and reference direction. The magnetoresistive array 16 measures the absolute position of a passing magnet 7, 8, 9 by each of the four MR sensors 16A-D measuring the strength and angle direction of the magnet field of the magnet and providing outputs as shown FIG. 4. The multi outputs of the sensor array 16 are fed into the signal conditioning circuitry 50 shown in FIG. 2A and linearly processed by the controller 54 through a specific 'Relay' algorithm so as to provide a linear measurement which is substantially proportional to the position of the magnet as shown in FIG. 5.

Referring now to FIG. 2B, which illustrates in more detail the trigger sensor device shown in FIG. 1, this sensor device is an analog MR or Hall Effect sensor 57 combined with threshold comparator 58, which raises a triggering signal 59, which can be for example a pulse, a rising edge from low voltage level to high voltage level, or falling edge from high voltage level to low voltage level. The MR or Hall Effect sensor 58 is configured to operate in saturation mode which is the same working mode as the MR sensor array 16.

Advantageously, when a magnet 7, 8, 9 passes by the analogue sensor 57 in saturation mode, the output of the sensor is only sensitive to the angle position of the magnetic field rather than intensity of the magnet field so that the airgap change between magnet and sensor does not affect the output of the sensor. With the comparator 58 and a certain threshold set, an accurate triggering signal 59 can be raised to trigger operation of the position sensor device 4 to measure the position of the magnet passing the position sensor device. The trigger sensor 6 can alternatively consist of an array of MR or Hall Effect sensors 57 to increase the detection range of the trigger sensor as required. Combining a threshold comparator 58 with an analog MR or Hall Effect sensor array is advantageous in that a trigger signal can be raised with less hysteresis than a digital MR or Hall Effect sensor thereby improving the triggering accuracy of the trigger device sensor 6.

The output 6A of the trigger sensor device 6 is coupled to the I/O port of the controller 54 shown in FIG. 2. The controller 54 is configured to start reading the position signals 55 to generate output signal 60 in response to receiving trigger signal 59 from the trigger sensor device 6.

In the illustrative embodiment, controller 54 is configured to generate an output strain signal 60 corresponding to the strain in the gauge length. Controller 54 is arranged to process position signals 55 to determine the individual gauge length 12 and then compare this gauge length to a predetermined original gauge length stored in the controller to determine the strain. However, in an alternative embodiment, controller 54 could be configured to simply provide an output signal representing the position of the magnet passing the position sensor device 4 which is a measure of the strain in the gauge length.

System 1 can measure the strain of a line having an unlimited measurement length and gauge length down to 10 mm. Furthermore, the system 1 has a strain measurement resolution up to 0.005% strain over 1 m gauge and exhibits good reliability.

In order to be able to identify a particular gauge length being measured by the sensor gauge sensor system 1, the sensor target assembly 3 also includes a plurality of RFID tags 10, 11 which are located between respective magnet pairs 7, 8, 9, as best shown in FIG. 1. The sensor system 1 also includes an RFID reader 5 located along side the desired travel path 20 such that when the line is moved under tension along the desired path 20, the RFID reader 5 reads each individual RFID tag passing in succession by the reader and generates a signal identifying the particular RFID tag and therefore the particular gauge length 12 being measured by the system 1. The output 5A of RFID reader 5 is operably coupled to the controller 54. RFID reader technology is known in the art and will not be described further here.

Figure 6:
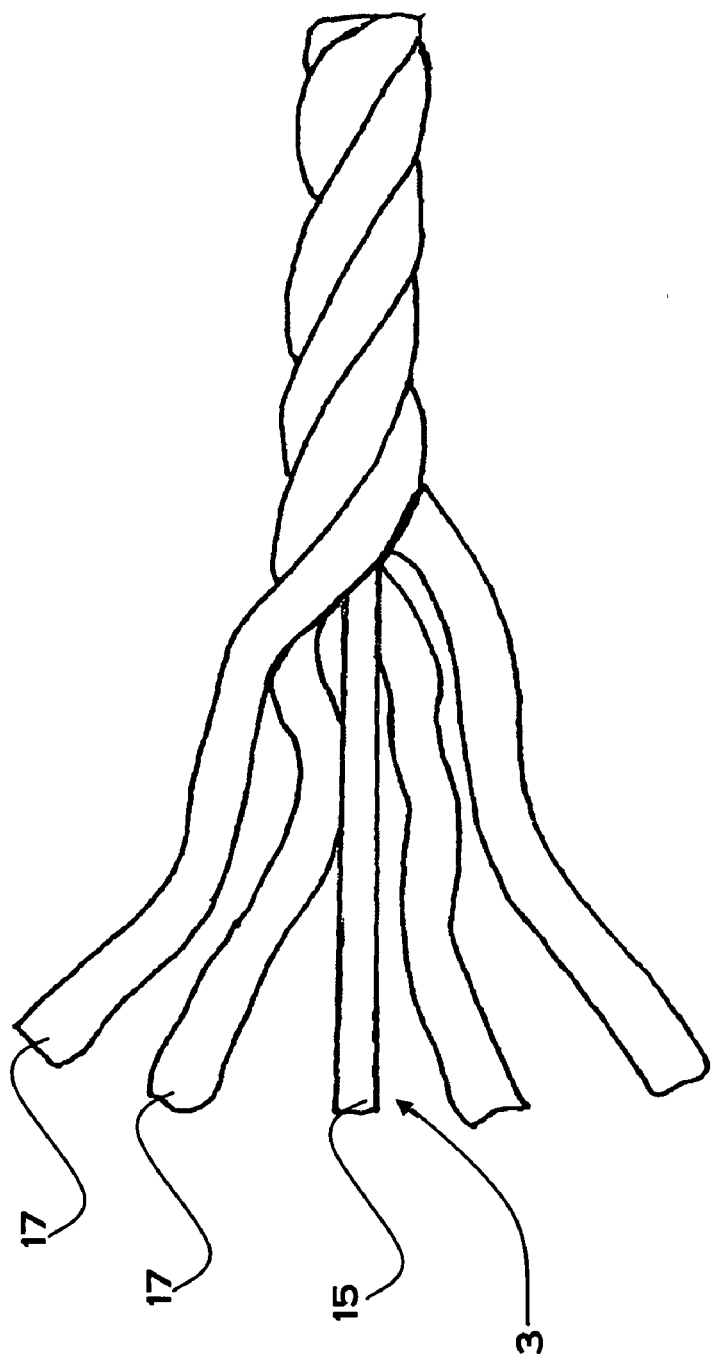
FIG. 6 illustrates one end of the line of FIG. 1 in which the rope end fibers are shown partially braided or twisted together around the end of a carrier tube of the sensor system.

As shown in FIG. 1, and additionally FIG. 6, which illustrates the end of the fiber rope of FIG. 1 with the rope end fibers only partially twisted around the sensor target assembly, the sensor target assembly 3 includes a carrier tube 15 made from plastic or other suitably flexible material in which the plurality of magnets 7, 8, 9 and RFID tags 10, 11 are held and which is integrated in the rope during the rope fabrication by twisting or braiding the rope fibers 17 around the carrier tube 15.

During manufacture of the sensor target assembly 3, silicone material 13 or other suitable filling material is filled in the carrier tube together with the RFID tags 10, 11 and magnets 7, 8, 9, which are cylindrical in form, such that the magnets are distributed along the length of the carrier tube at equidistant intervals equal to the original gauge length and so that each RFID tag is located in between each pair of magnets. Cylindrical magnets are advantageous in that they diminish the effects of rope rotation during rope deployment. Furthermore, embedding the magnets and RFID tags in silicone filling in the carrier tube 15 enables excellent elongation of the senor target assembly 3. Each magnet is arranged to extend longitudinally along the central axis of the tube 15 with the N pole of each magnet facing the S pole of the next. Alternately, the S or N poles can be orientated to face the position sensor device 4, Incorporating RFID tags 10, 11 into the sensor target assembly 3 between magnets 7, 8, 9 and arranging an RFID reader 5 along side the path of travel of the rope is advantageous in that individual gauge lengths being measured by the position sensor device 4 can be immediately and reliably identified by the RFID reader 5 sensing each RFID tag 10, 11 identifying each individual gauge length.

In the illustrative embodiment of strain gauge sensor system 1 of FIG. 1, the RFID reader 5 is located between the position and trigger sensors 4, 6. However, the RFID reader could alternatively be located for example to one side of the position and trigger sensors 4, 6, or on the opposite side of the rope travel path 20. Also, the sensor system 1 could be used to measure a plurality of gauge lengths without such RFID tags.

The type of deployment device for deploying the line 2 under tension along the desired path 20 will depend on the particular application. In the illustrative embodiment of the strain gauge sensor system 1 which is adapted for use in marine mooring applications, the system 1 includes a deployment device as shown in FIG. 7 which includes a box frame 201 and two parallel rows of rotatably mounted winding discs 250,251 for winding line 2 under tension between the opposite discs 250, 251 and deploying or returning the line. Position sensor device 4, RFID reader 5 and trigger switch 6 of the strain sensor system 1 of FIG. 1 are fixed to the frame in alignment with the path of travel of the rope.

Figure 7A:
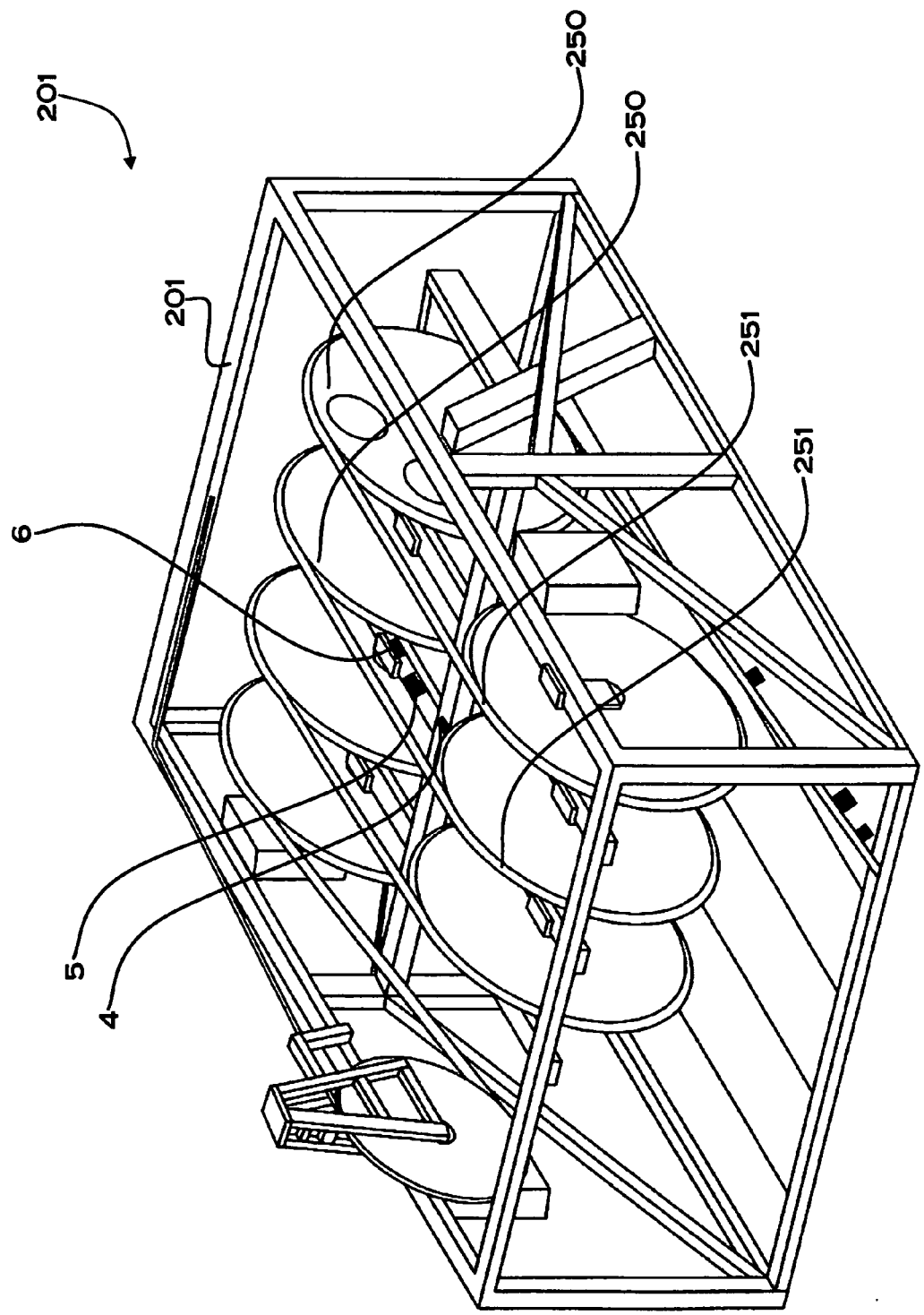
FIGS. 7A & B illustrate perspective views of deployment devices for deploying the fiber rope of FIG. 1.
Figure 7B:
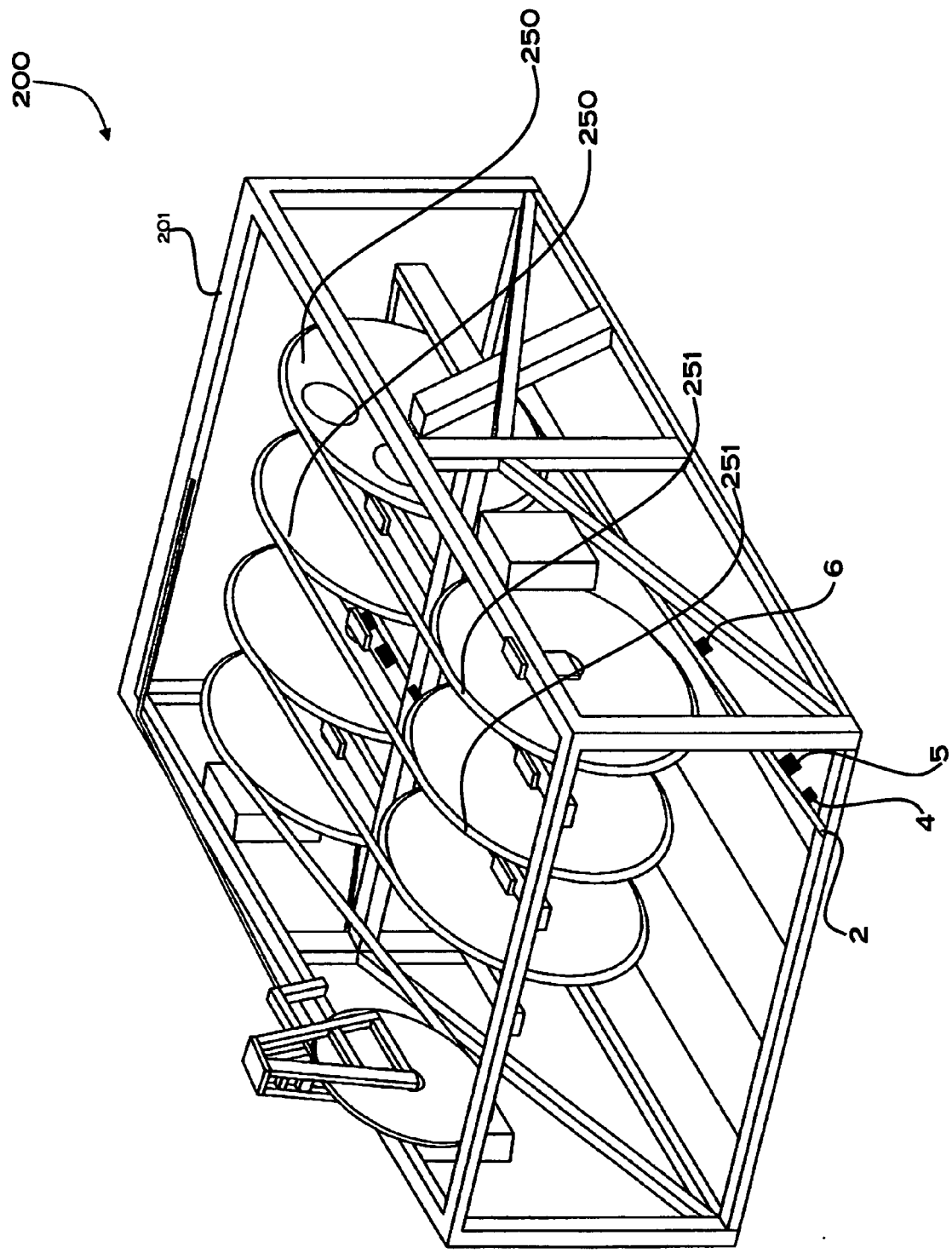

Depending on the exact mechanical dimensions of deployment machine and the required gauged length of the rope, the position sensor device 4, RFID reader 5 and trigger sensor 4 can be aligned along the travel path of the rope 2 just before the winding disc arrays 250,251, as shown in FIG. 7A, or alternatively, can be aligned along a travel path of the rope between a pair of opposite winding discs 250,251, as shown in FIG. 7B.

A method of operating the strain sensor system according to one embodiment will now be described with reference to FIGS. 1-8. Before the system 1 can be utilized to measure strain in the rope 2, the controller 54 must be programmed with the original gauge length of the rope under test. This is achieved by measuring the gauge length of the original, unstrained rope carrying the sensor target assembly either using the system 1, or by other means, and the original gauge length is recorded in the controller.

Figure 8:
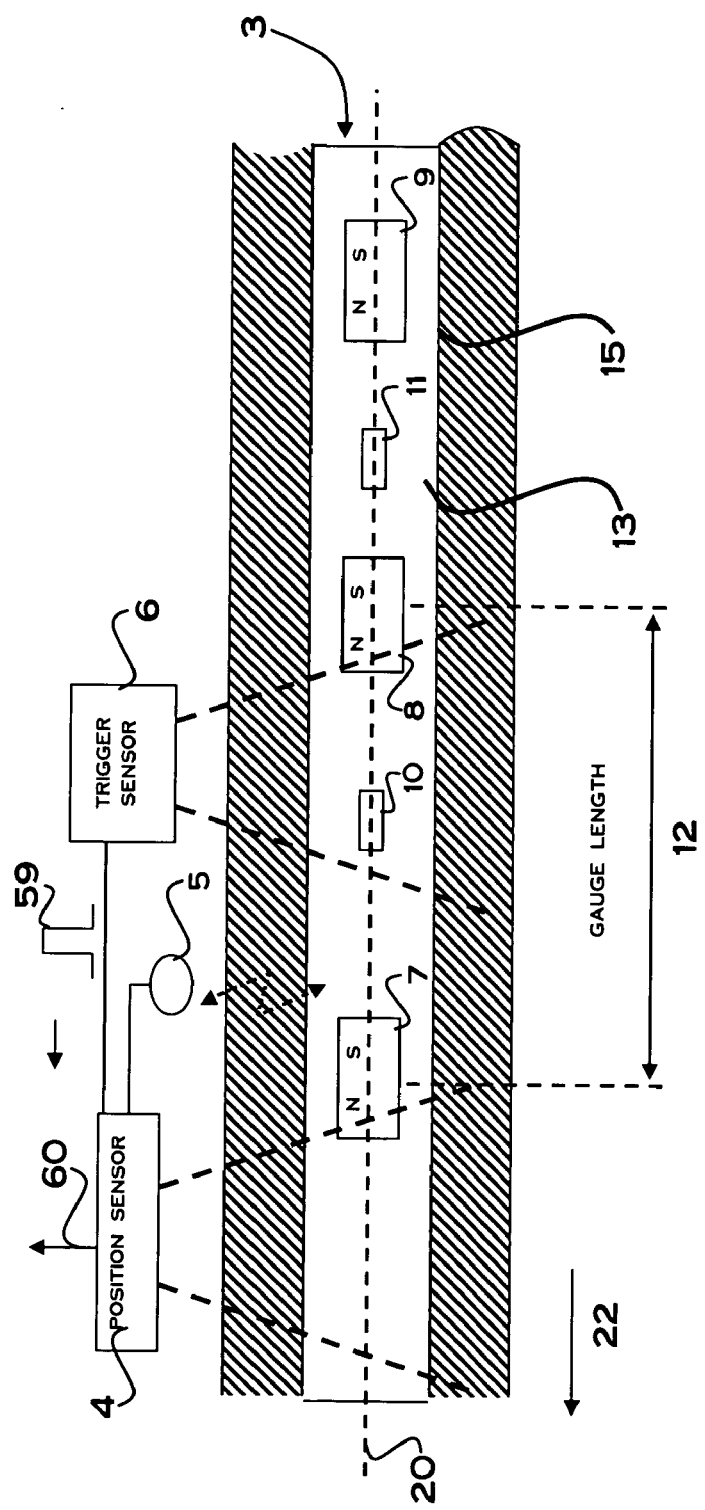
FIG. 8 illustrates the sensor system of FIG. 1 immediately prior to the rope moving to the position shown in FIG. 1.

Let us assume now that the system 1 has been set up ready to measure the strain in the rope 2 being deployed by the deployment device 200 of FIG. 7A. The rope is initially deployed under tension by the deployment device along path 20 in the direction of arrow 22 such that adjacent magnets 7,8 are about to enter the field of view of the trigger sensor device 6 and position sensor device 4, respectively, as indicated in FIG. 8. As the rope 2 is further deployed to the position shown in FIG. 1, the trigger sensor 6 triggers in response to sensing the position of the magnet 8 and sends a synchronization pulse 59 to the controller 54 causing the controller to read position signal output signals 55 representing the position of the adjacent magnet 7 and therefore the gauge length 12 between adjacent magnets 7, 8. Controller 54 compares this measured gauge length 12 to the pre-recorded original gauge length and determines the strain by calculating the difference between the measured and original gauge lengths. Also, at this stage of deployment, the RFID reader 5 detects the RFID tag 10 located between the pair of magnets 7, 8 and passes a signal, which identifies the gauge length 12 between magnets 7, 8 in the process of being measure, to the controller 54. Controller 54 generates the output strain signal 55 which represents the measured strain together with the identity of the gauge length under interrogation.

Further deployment of the line 2 along path 20 causes the next adjacent pair of magnets 8, 9 to pass into the field of view of the position trigger sensor devices 4,6, respectively, causing trigger sensor device to trigger again and the system to accordingly calculate the strain between adjacent magnets 8,9. Also, this further deployment of the line 2 causes the RF reader to read the next RFID tag 11 which identifies the next gauge length to being measured between the next pair of magnets 8,9. As the line is yet further deployment, this measuring process is repeated until all successive magnets are sensed, their associated gauge lengths have been measured and the strain for each gauge length calculated.

Figure 9:
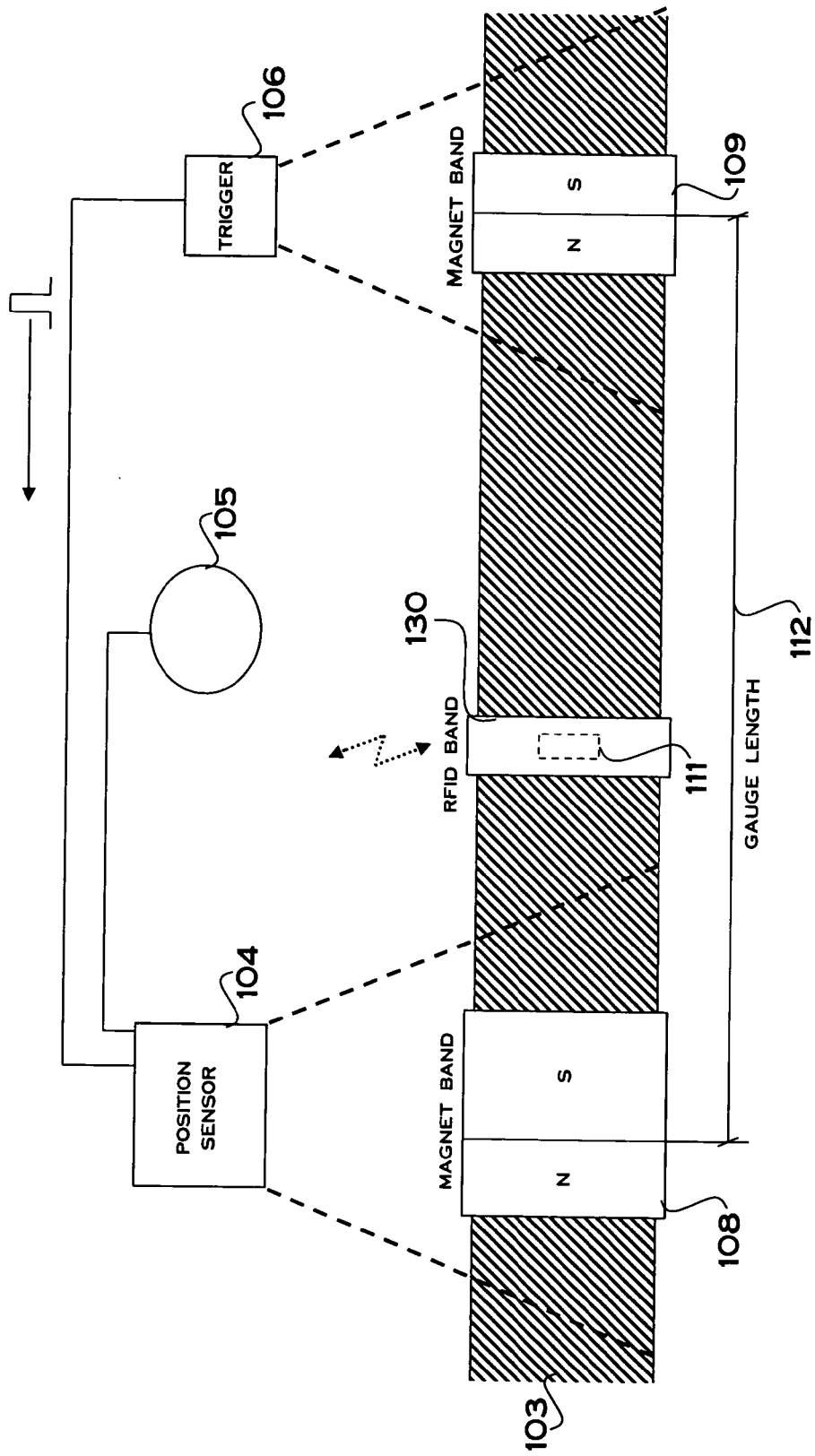
FIG. 9 illustrates a strain gauge system according to another embodiment.
Figure 10:
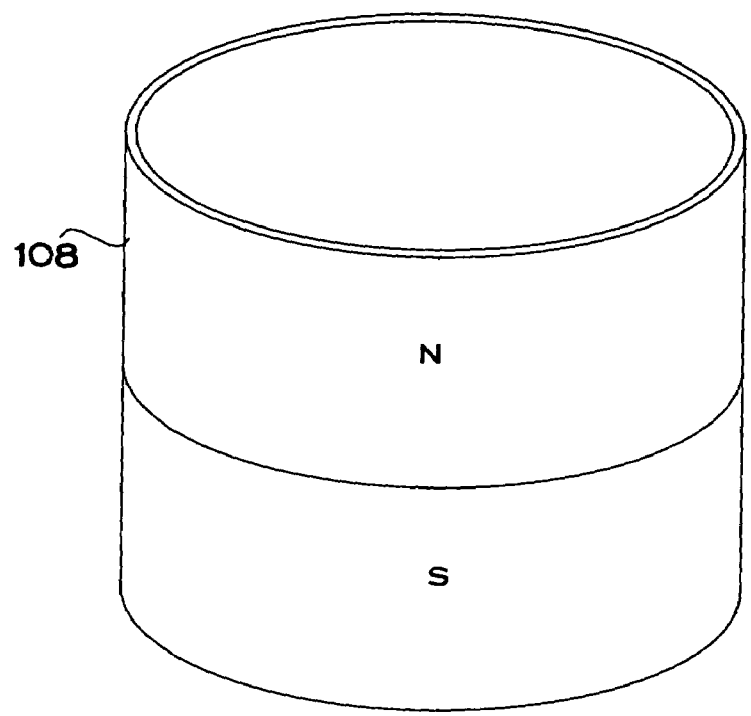
FIGS. 10 & 11 illustrate perspective views of a magnet band and RFID band, respectively, of the sensor target assembly of the strain gauge sensor system of FIG. 9.
Figure 11:
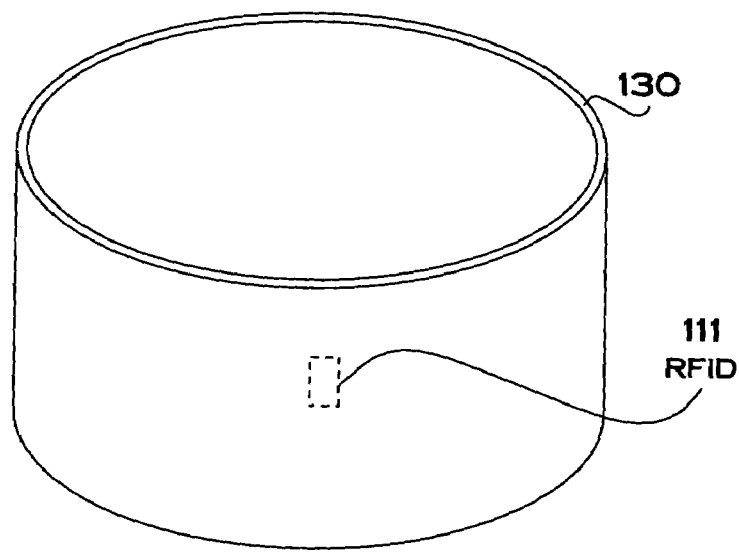

Referring now to FIG. 9, there is shown a plan view take from above a strain gauge sensor system according to another embodiment. Strain gauge sensor system 100 is similar to strain gauge system 1 of the first embodiment shown in FIG. 1 with the exception that the sensor target assembly comprises magnets 108,109 and RFID tags 111,121 mounted directly around the exterior of the rope 100 instead of in a carrier tube. Trigger and position sensor devices 106,104 and RF reader 105 are identical to trigger and position sensor devices 4, 6 and RF reader 5, respectively, of system 1 of the first embodiment shown in FIG. 1. As best shown in FIG. 6, which illustrates a perspective view of one of the magnets 108, each magnet is formed as a cylindrical rubber band which has opposite ends magnetized N pole and S pole, respectively, and which is fixed around the rope. Also fixed around the rope between the rubber band magnets 108,109 are additional rubber bands 130 in which are embedded the RFID tags 111,121. By mounting the magnets and RFID tags around the rope using rubber bands, the effect of rope rotation during deployment can be diminished.

In a strain gauge sensor system according to another embodiment (not shown), a strain gauge sensor system is similar to strain gauge system 1 of the first embodiment shown in FIG. 1 with the exception that the trigger sensor device 6 is configured as a digital MR or digital hall effect sensor such that when the magnet passes by the digital MR sensor (or digital hall effect sensor) and crosses the operating point of magnetic intensity of the sensor. The digital sensor generates a pulse output for triggering the position sensor device 4. Adopting a digital MR or digital Hall Effect sensor as the trigger sensor device enables the system to be manufactured at lower cost.

In the illustrative embodiments of the strain gauge sensor systems of the accompany figures, the sensor systems are configured for measuring the strain in lines, such as fiber ropes or other high performance lines. However, depending on the line application, the lines being measured can be fabricated from other materials including manila, hemp, hair, nylon, and steel. The sensor system can also be configured to measure strain in other linear members such as for example woven straps or chains which are used in applications where rope or other lines could be used. Also the sensor system can measure compression in a line or other member with a certain gauge length if the compression causes the sensor target carried on the member to shrink.

Furthermore, the sensor system can also be configured to measure strain in members other than members. For example, the sensor target assembly 3 of the system of FIG. 1 of the accompany drawings could be bonded or fixed to a concrete slab to measure the strain therein. Other applications include health monitoring of dam, bridge, concrete structure, composite materials to name a few with non-contact measurement of the strain.

Figure 12:
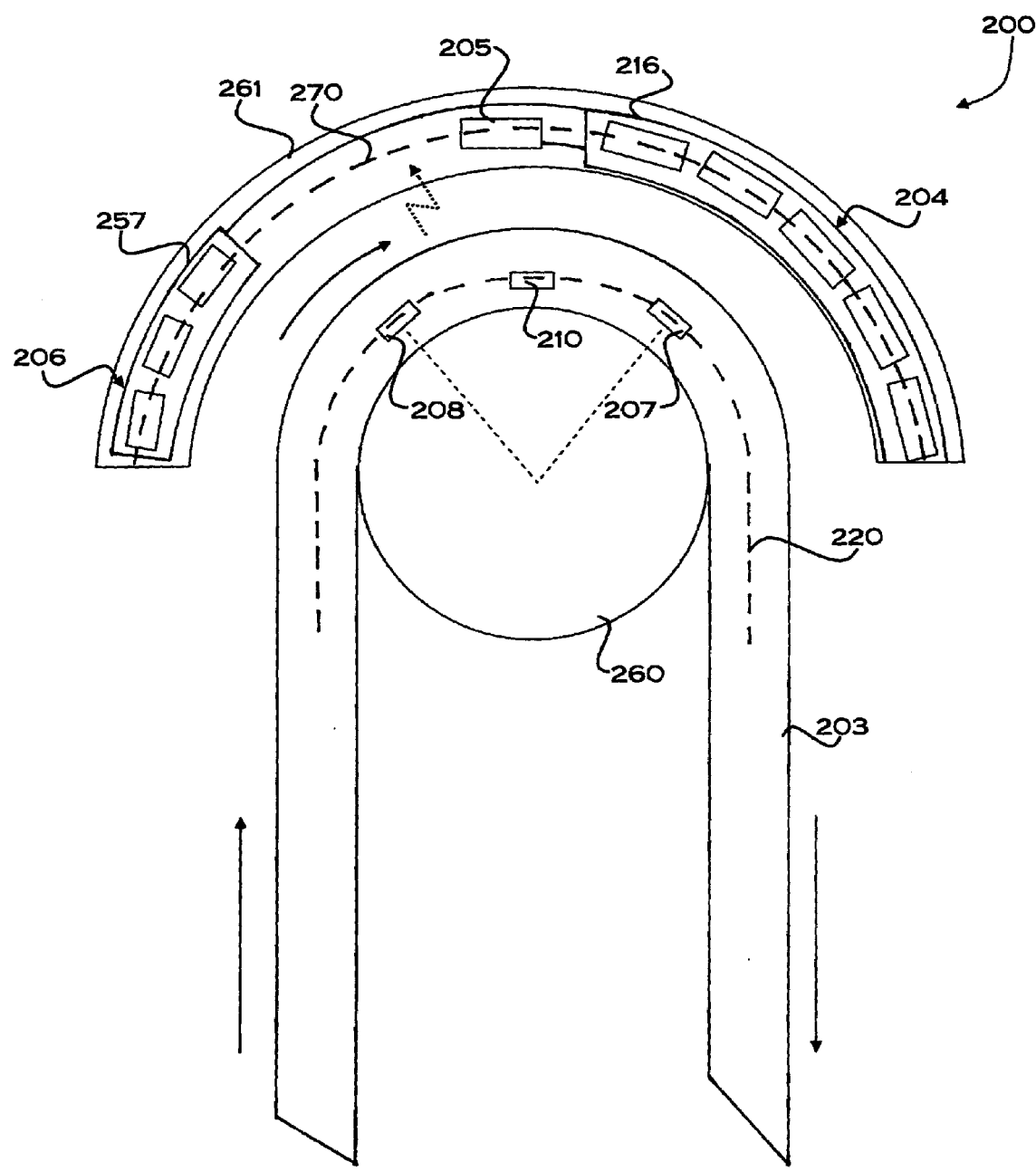
FIG. 12 illustrates a schematic diagram of a strain gauge sensor system for measuring strains in a target line moving non-linearly, in accordance with an alternative embodiment.

Also, in other embodiments the sensor system and method can be arranged to measure strain in a flexible target moving non linearly rather than linearly, such as for example in bending measurements in which the sensor array of the position sensor device is configured in a bending angle. One example of such a sensor system is shown in FIG. 12 which illustrates a schematic of a strain gauge sensor system for measuring strains in a target line moving non-linearly according to another embodiment. Sensor system 200 is identical to that of the sensor system 1 of FIG. 1 with the exception that the position sensor array 216 and trigger sensor array 257 are substantially aligned on a curved mount 261 along a curved path which is concentric with and at a certain airgap distance from a curved path 220 along which the target line 203 rotates on a grooved pulley or sheave 260. RF reader 205 is located between the position sensor and trigger sensor arrays 216, 257. The other components of the position sensor device 204, that is, the controller and signal conditioning circuitry, and of the trigger sensor device 208 are not shown in FIG. 12.

In operation, the trigger sensor 206, which is configured adjacent one end of the curved path 220, senses the magnet 208 rotating towards the other end of the curved path and triggers the position sensor device 204, located adjacent the other end of a curved path, to measure the relative angular position or bending angle of the adjacent magnet 207 passing the position sensor device 204. If the line 203 undergoes strain, the sensor system 200 would be able to measure the bending angle change between opposite ends of the gauge length within the adjacent magnets. The position sensor device 206 is configured to calculate the strain from the relative angular position measured by the position sensor 204. A similar system can also be used to measure a rigid target which is circular or curved in shape and which rotates along a curved or circular path in the same way that the flexible target 203 rotates along arc path 220.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only.

For example, the sensor system of the illustrative embodiments can be configured such that the position sensor device, RFID reader and trigger sensor move relative to the line in order to measure the strain in each gauge length instead of the line moving relative to the position sensor, RFID reader and trigger sensor. Furthermore, the system of FIG. 1 of the accompanying drawings can measure the strain in an analogous manner when the position sensor device 4 takes the place of trigger sensor device 6 and the trigger sensor device 6 takes the place of the position sensor device 4. Finally, the sensor system can measure the strain using a pair of spaced apart position sensor devices rather than a position sensor device and trigger sensor device to measure the respective positions of adjacent magnets and thereby determine the strain in the gauge length.

Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A strain gauge sensor system for measuring strain in a member, said system comprising:
   a sensor target assembly for carrying on said member, said sensor target assembly comprising at least one pair of adjacent first and second magnets spaced apart by a gauge length; and
   a first sensor device and a second sensor device for respectively magnetically sensing said first and second magnets;
   wherein said first sensor device is fixed spaced apart from said second sensor device, such that, in use, relative motion between said member carrying said sensor target assembly and said first and second sensor devices causes said first and second sensor devices to sense said first and second magnets, respectively, and to thereby generate first and/or second position signals representing the position of said first and/or second magnets and therefore the strain in said gauge length and wherein said first and second devices are interconnected such that said first position signal triggers operation of said second sensor device to generate said second position signal.

2. The system of claim 1, wherein said sensor target assembly comprises a plurality of magnets distributed apart by individual gauge lengths along said member; and
   wherein said first and second sensor devices are located spaced apart along side a desired path of travel of said member such that, when a length of said member is fed along said desired path of travel, said first sensor device, in response to sensing a passing magnet, triggers said second sensor device to measure the position of an adjacent passing magnet and generate said second position signal for processing to determine the strain in said individual gauge length.

3. The system of claim 2, wherein said first sensor device comprises at least one magnetoresistive sensor or a hall effect sensor and/or wherein said second sensor device comprises at least one magnetoresistive sensor or hall effect sensor.

4. The system of claim 2, further comprising at least one RFID tag for identifying individual gauge lengths being measured by said strain gauge sensor system, said RFID tag(s) being carried on said member between respective magnets; and
   an RFID reader located along side said desired path of travel for reading said RFID tag(s) successively passing said RFID reader thereby identifying each individual gauge length being measured by said strain gauge sensor system.

5. A strain gauge sensor system for measuring the strain in a member, said system comprising a position sensor device for magnetically measuring the position of a moving magnet;
a trigger sensor device for triggering said position sensor device in response to magnetically sensing an adjacent moving magnet;
a sensor target assembly comprising a plurality of magnets carried spaced apart by individual gauge lengths along said member, wherein said position and trigger sensor devices are configured spaced apart along side a desired path of travel of said member such that, when said member is fed along said desired path of travel, said trigger sensor device, in response to sensing a passing magnet of said sensor target assembly, triggers said position sensor device to measure the position of an adjacent passing magnet, wherein said desired path of travel is substantially linear or non-linear and said position sensor device comprises an array of magnetoresistive sensors or Hall Effect sensors spaced from said assembly by an airgap distance, wherein said trigger sensor device comprises at least one analog or digital magnetoresistive or a Hall Effect sensor and optionally a comparator coupled to said position sensor device for generating a trigger signal;
a controller coupled to the output of said trigger sensor and said array of magnetoresistive or Hall Effect sensors such that said controller, in response to receiving said trigger signal, reads the outputs of said array of magnetoresistive or Hall Effect sensors and compares the measured gauge length determined from said outputs with a predetermined original gauge length to thereby provide the strain in said gauge length;
a plurality of RFID tags for identifying individual gauge lengths being measured by said strain gauge sensor system, said RFID tans being carried on said member between respective magnets; and
a RFID reader located along side said desired path of travel for reading each RFID tag successively passing said RFID reader, said RFID reader being coupled to said controller to enable said controller to associate said RFID tag with said strain in said gauge length identified by said RFID tag.

6. The system of claim 5, wherein said magnetoresistive sensors comprise at least one magnetoresistive sensor selected from the group consisting of anisotropic magnetoresistive AMR, giant magnetoresistive GMR and tunnel magnetoresistive TMR chips.

7. The system of claim 5, wherein said member comprises a fiber rope.

8. The system of claim 7, wherein said sensor target assembly further comprises a carrier tube integrated in said rope, said magnets and/or said RFID tags being embedded in said carrier tube.

9. The system of claim 8, wherein said carrier tube comprises a plastic tube and wherein said magnets and/or said RFID tags are embedded in silicone filled in said carrier tube.

10. The system of claim 9, wherein said magnets and/or RFID tags are carried or integrated in rubber bands fixed around said rope.

11. The system of claim 10, further comprising a deployment device for deploying said fiber rope along said desired path of travel, said sensor array and said position and trigger sensor devices and/or said RFID reader being carried on said deployment device.

12. A method of measuring strain in a member, said method comprising carrying a plurality of magnets spaced apart by gauge lengths along a length of said member;

providing a position sensor device spaced apart from a trigger sensor device, straining said member;

moving said member under strain past said position sensor and trigger sensor devices;

generating a trigger signal in response to sensing the magnetic field of a passing magnet using said trigger sensor;

transmitting said trigger signal to said position sensor device;

sensing the magnetic field of an adjacent passing magnet using said position sensor device, generating a position signal using said position sensor device in response to receiving said trigger signal, determining the strain in said gauge length between said adjacent magnets from said position signal;

carrying RFID tags on said member between said magnets; and reading said RFID tans to identify each gauge length.

13. The method of claim 12, wherein the step of providing said position sensor device comprises providing at least one first magnetoresistive or Hall Effect sensor.

* * * * *

UNITED STATES PATENT AND TRADEMARK OFFICE
CERTIFICATE OF CORRECTION

PATENT NO. : 7,441,464 B2 Page 1 of 1
APPLICATION NO. : 11/594624
DATED : October 28, 2008
INVENTOR(S) : Frank Turnbull et al.

It is certified that error appears in the above-identified patent and that said Letters Patent is hereby corrected as shown below:

In Column 14, line 6, delete "tans" add -- tags --.

Signed and Sealed this

Sixteenth Day of December, 2008

JON W. DUDAS
*Director of the United States Patent and Trademark Office*